United States Patent [19]

Lill et al.

[11] 4,287,446

[45] Sep. 1, 1981

[54] STATOR FOR STEPPER MOTOR

[75] Inventors: John F. Lill, Harrisburg; Nelson E. Neff, Hershey, both of Pa.

[73] Assignee: AMP Incorporated, Harrisburg, Pa.

[21] Appl. No.: 52,719

[22] Filed: Jun. 27, 1979

[51] Int. Cl.³ .......................................... H02K 11/00
[52] U.S. Cl. ................................................ 310/71
[58] Field of Search .............. 310/68 R, 71, 254, 72, 310/194; 339/98, 97

[56] References Cited

U.S. PATENT DOCUMENTS

| | | | |
|---|---|---|---|
| 3,636,393 | 1/1972 | Pieper | 310/71 |
| 3,780,323 | 12/1973 | Swain | 310/71 X |
| 3,979,615 | 9/1976 | Neff | 310/71 |
| 3,984,908 | 10/1976 | Ackley | 310/71 X |
| 4,038,573 | 7/1977 | Hillyer et al. | 310/71 |
| 4,039,875 | 8/1977 | Morreale | 310/71 X |
| 4,118,103 | 10/1978 | Lerdy et al. | 339/98 |
| 4,130,331 | 12/1978 | Neff et al. | 339/97 |
| 4,147,398 | 4/1979 | Lill | 339/98 |

*Primary Examiner*—Donovan F. Duggan
*Attorney, Agent, or Firm*—Frederick W. Raring

[57] ABSTRACT

A stator for a stepper motor comprises a stator core having a plurality of coil supports on which coils are wound. Selected predetermined coils are connected in series by intermediate portions of the coil wires which extend around the periphery of the core. The end portions of the wires which extend from the series connected coils to terminal housings are connected to terminals in the housings. The lead wires which extend from the stator are also connected to the terminals in the housings. The stator is produced by a continuous winding process followed by a terminal insertion step in which the terminals are inserted into the terminal housings. The method substantially reduces the amount of labor required to produce the stator.

11 Claims, 16 Drawing Figures

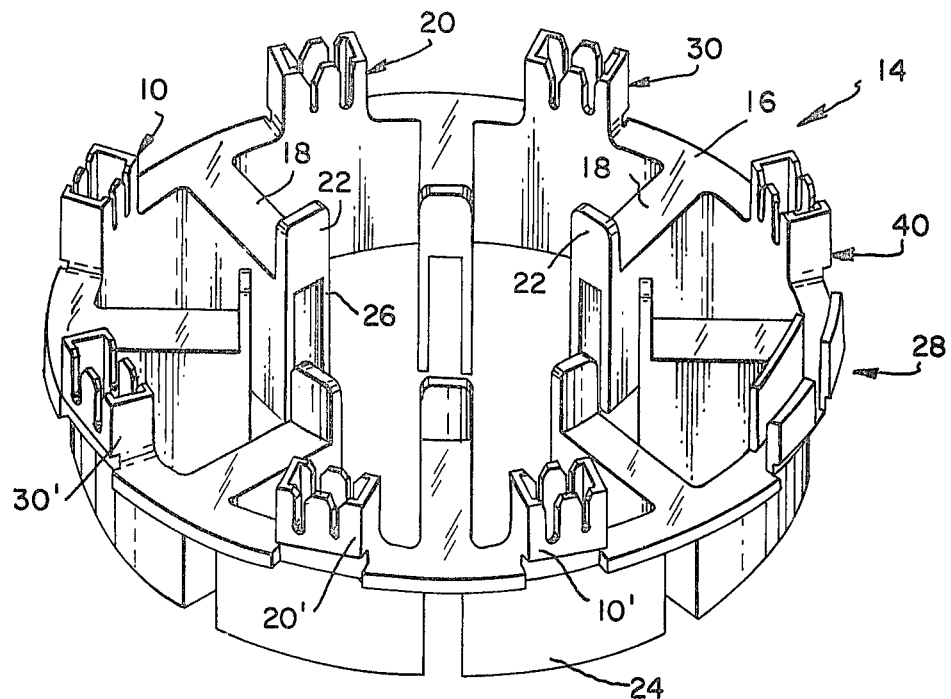
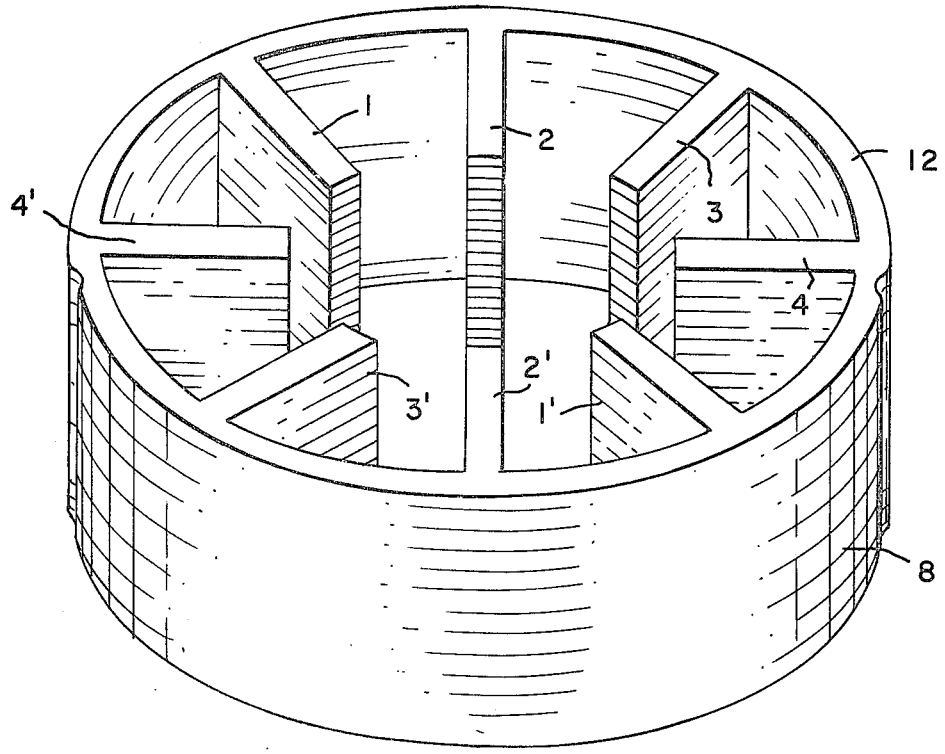
Fig. 2

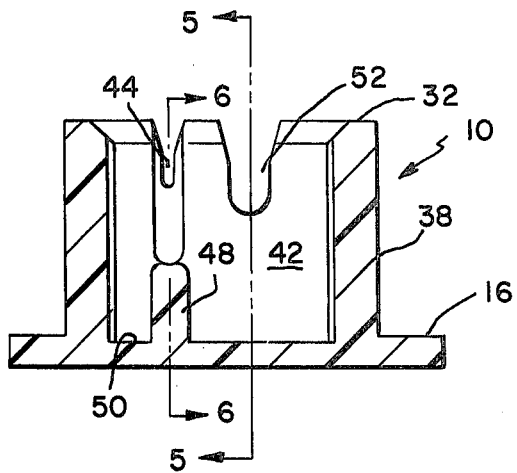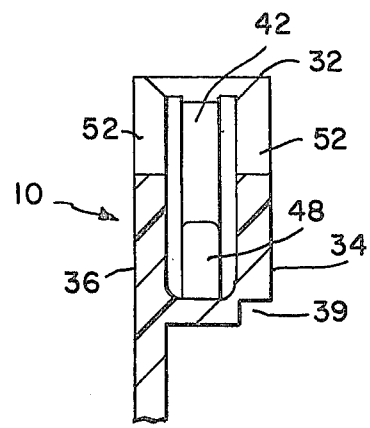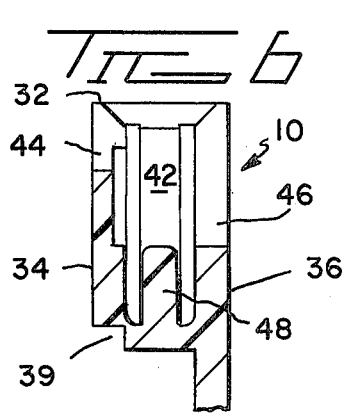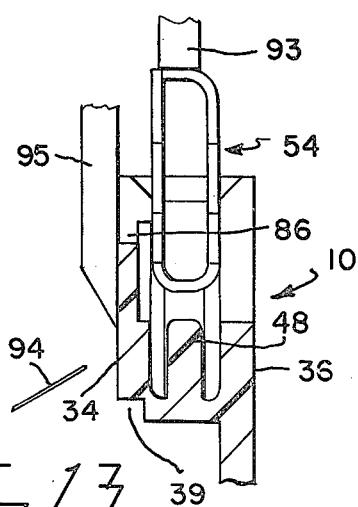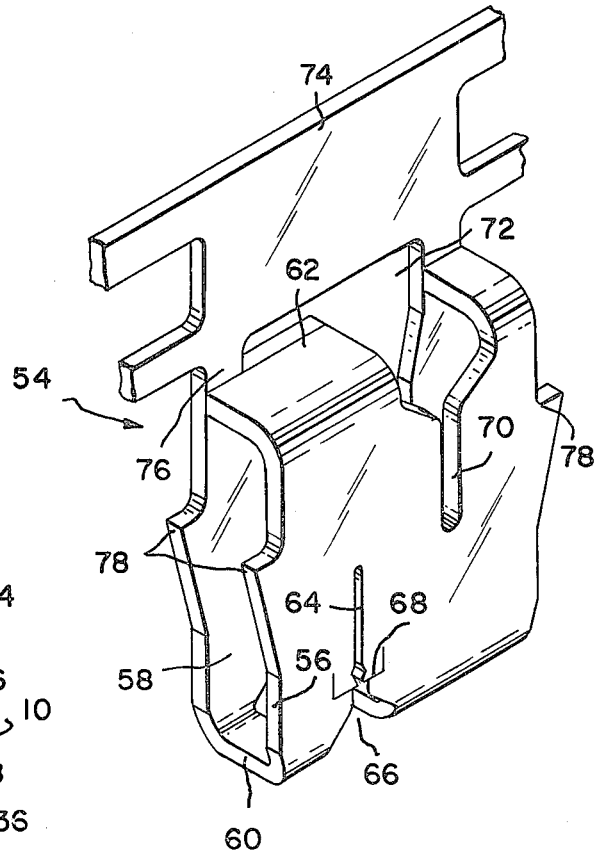

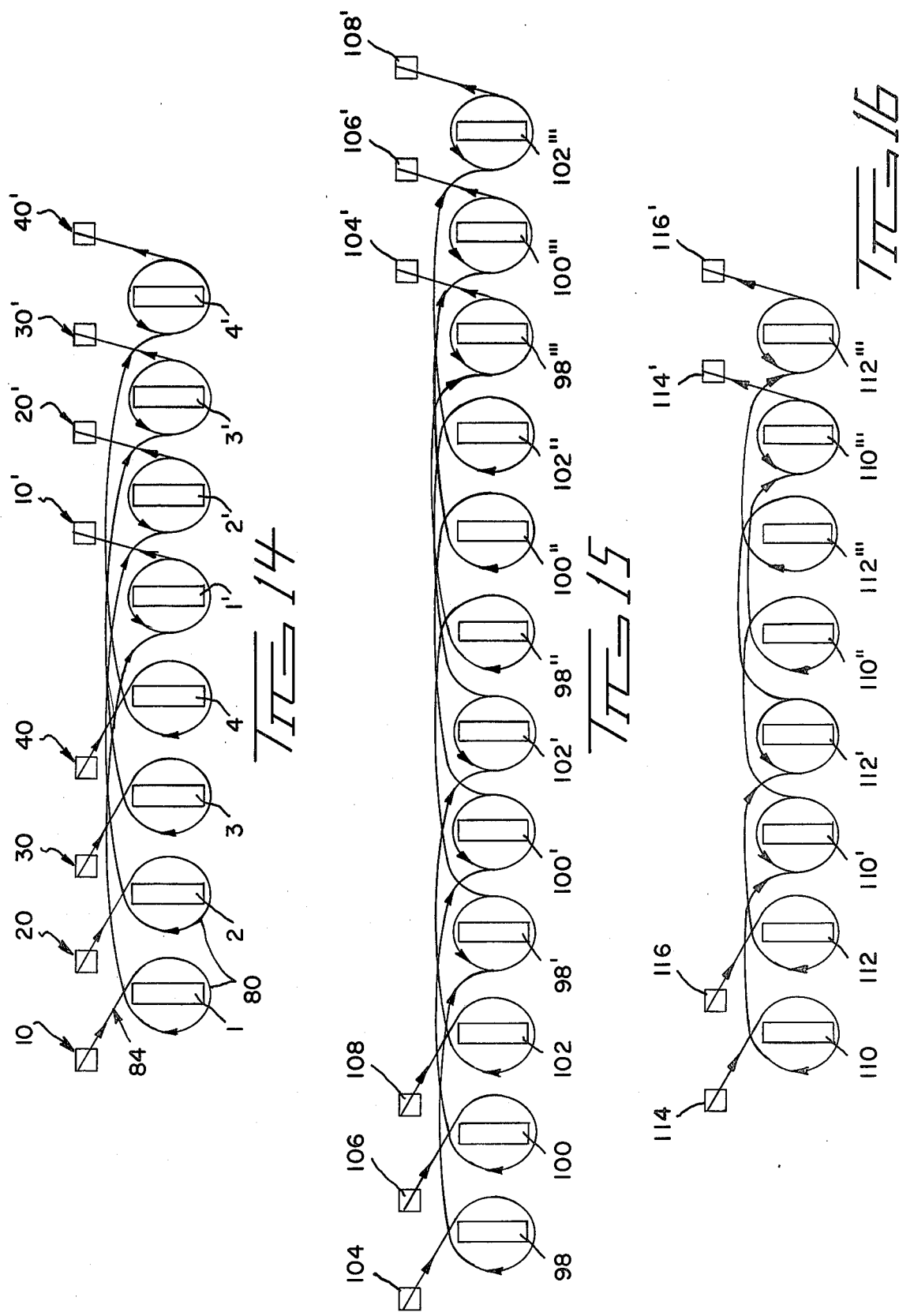

STATOR FOR STEPPER MOTOR

FIELD OF THE INVENTION

This invention relates to stators for stepper motors and to manufacturing process for producing stepper motor stators.

BACKGROUND OF THE INVENTION

A stepper motor stator comprises a hollow cylindrical stator core having an even number of inwardly directed coil supports on which coils are wound. Selected predetermined sets or groups of coils are connected in series by intermediate portions of coil wire which extend around the periphery of the stator and lead wires are connected to the end portions of the coil wires which extend from the coils at the ends of the sets. Stepper motors are commonly classified with reference to the number of phases and the number of coils on the stator. The number of phases of a stepper motor is equal to the number of continuous coil wires, each coil wire being wound on one set of coil supports to produce a set of coils. For example, a four phase stepper motor having eight coils would have four continuous wires in its windings with each wire wound onto two coil supports and forming two coils per phase. A four phase stepper motor having sixteen coils would have four wires in its winding with each wire wound on four of the coil supports and thereby forming four coils per phase. A three phase stepper motor having twelve coils on its stator would comprise three continuous coil wires, each of which would be wound on four coil supports and a two phase motor having eight coils on its stator would similarly have two continuous wires with each wire wound on four coil supports.

The coils of a stepper motor stator are wound on the coil supports by sophisticated winding machines which draw wire from an endless source and wind the coils on the coil support such that the sets of coils are connected to each other by intermediate portions of the coil wire. When a stator is taken from a winding machine, there are portions of the coil wire extending around the periphery of the core which must be cut away and discarded as scrap, leaving the ends of the wires extending from the windings. These coil wire ends are then connected to lead wires by a suitable connecting process, for example, by crimping connecting devices onto the lead wires and the ends of the coil windings or by soldering the lead wires and the ends of the coil windings to terminal areas on a small circuit board mounted on the stator.

It can be appreciated from the foregoing brief description of the manufacturing process for stepper motor stators that the formation of the electrical connections between the ends of the coil wires and the lead wires is a time-consuming and costly process particularly in the case of four phase stepper motors, since a motor of this type has eight coil wire ends to which electrical connections of the lead wires must be made. The manufacturing process is also time-consuming for three phase and two phase motors. The steps of cutting away and discarding as scrap selected portions of the coil wire are usually carried out manually and inevitably, mistakes are made while these steps are being carried out. Careful testing of the stator is therefore required after the lead wires are connected to the coil windings and occasional reworking must be carried out to correct errors. It has been said that more than fifty percent of the cost of producing some types of stepper motor stators is in the labor cost of making the electrical connections between the ends of the coil wires and the lead wires.

The present invention is directed to the achievement of an improved stepper motor stator and to a manufacturing process for producing stepper motor stators at reduced cost.

In the practice of the invention, housings are mounted on one face of the stator core between adjacent pairs of coil supports. The housings are of the type which have a terminal-receiving cavity and coil wire-admitting slots in the sidewalls of the housing which communicate with the cavity so that the coil wire can be laced through the cavity and upon subsequent insertion of a terminal into the cavity, electrical contact with the coil wire is established.

The precise procedure which is followed to produce a stepper motor stator in accordance with the invention will depend upon the type of motor being manufactured, the number of phases and the number of coils. Following is a brief description of the procedure followed to produce a stator for a four phase stepper motor stator.

Wire from an endless source is laced through the wire-admitting slots of a first housing and then laced to a first coil support on which a coil is wound. After this first coil has been wound, the wire is laced around the periphery of the stator to another coil support, which is herein identified as a first opposite coil support, which is diametrically opposite to the first coil support. The wire from the endless source is then wound on the first opposite coil support and then laced through a first opposite housing which is immediately adjacent thereto. The wire is then passed around the periphery of the stator core, laced through a second housing and to a second coil support. The entire process of winding a coil, lacing the wire around to an opposite coil support, winding another coil, and then lacing the wire through an adjacent housing is repeated until coils have been wound on all of the coil supports. At the conclusion of the coil winding process, the coils which are wound on opposite pairs of coil supports will be connected in series and, in addition, excess wire will extend between the housings which must be removed. Terminals are then inserted into the housings and at the same time the excess wire on the periphery of the stator core which extends directly between the housings is removed by cutting the wires where they exit from the housings. The lead wires are then connected to the terminals, and to the ends of the coil windings, by inserting the lead wires into lead wire-receiving slots in the terminals. These lead wires can then be dressed through a strain relief means mounted on a stator face.

The foregoing brief description relates specifically to the manufacture of a four phase, eight coil stepper motor stator and the same general method, with modifications as discussed below, is used for other types of stepper motors.

DESCRIPTION OF THE DRAWING

FIG. 2 is a perspective view of a stator core prior to winding of the coils on the core and showing a molded housing support exploded from one face of the core.

FIG. 4 is a view taken along the lines 4—4 of FIG. 3.

FIGS. 5 and 6 are views taken along the lines 5—5 and 6—6 of FIG. 4.

FIG. 7 is a perspective view of a terminal of the type shown in FIG. 1 and showing a carrier strip to which the terminal is attached prior to insertion into the housing.

FIG. 13 is a fragmentary view illustrating the insertion of a terminal into a cavity and the cutting of a coil wire extending from the cavity.

FIG. 14 is a schematic diagram of a stepper motor stator for a four phase motor having eight coils, the type of stator shown also in FIGS. 1 and 12.

FIG. 15 is a schematic diagram of a three phase stepper motor stator having twelve coils.

FIG. 16 is a schematic diagram of a two phase stepper motor coil having eight coils.

PRACTICE OF THE INVENTION

In the following description, the practice of the invention to produce a stepper motor stator for a four phase stepper motor having eight coils will be described with reference to FIGS. 1-12 and this description will be followed with a brief discussion of the practice of the invention to produce other types of stepper motor stators such as the three phase motor stator shown in FIG. 15 or the two phase motor stator in FIG. 16.

Figure 1:
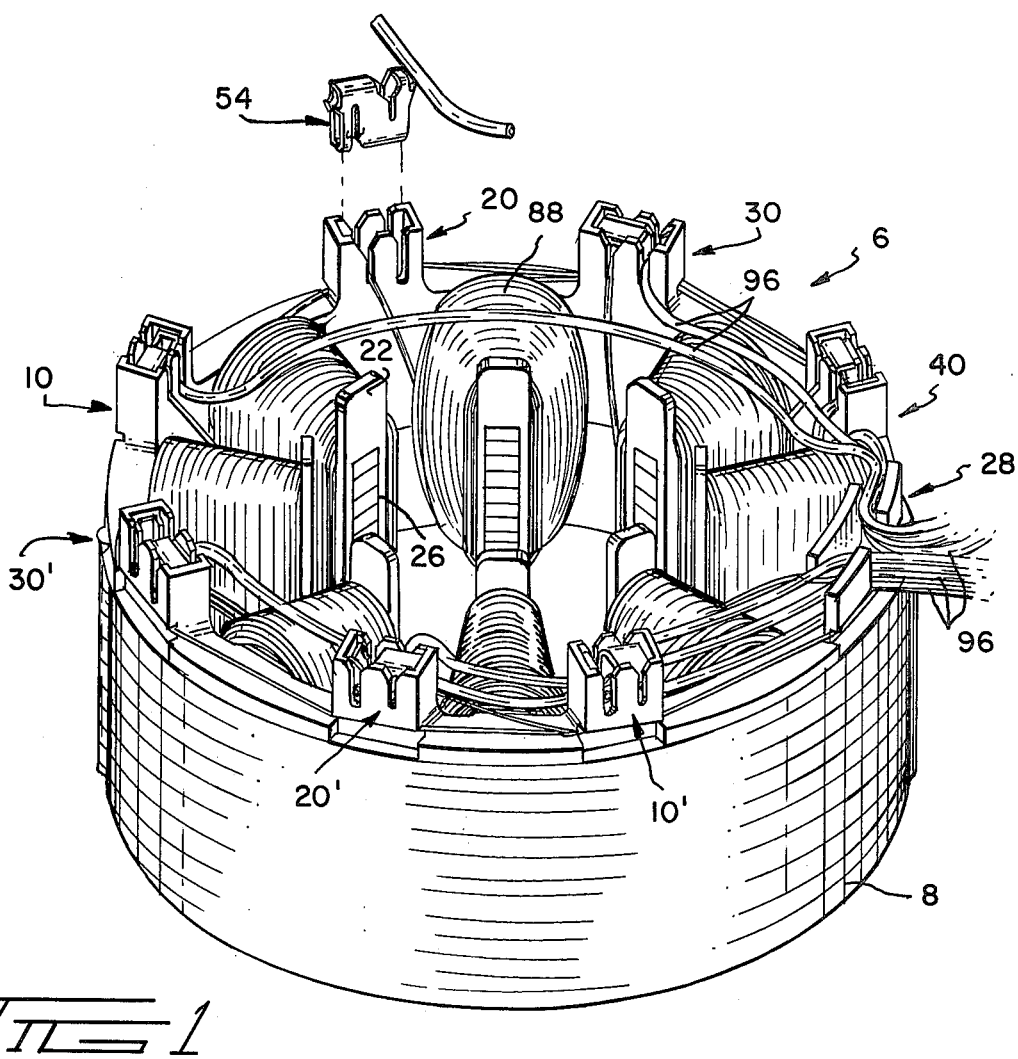
FIG. 1 is a perspective view of a stepper motor stator in accordance with the invention when one of the terminals is exploded from the housing in which it would be normally received.
Figure 3:
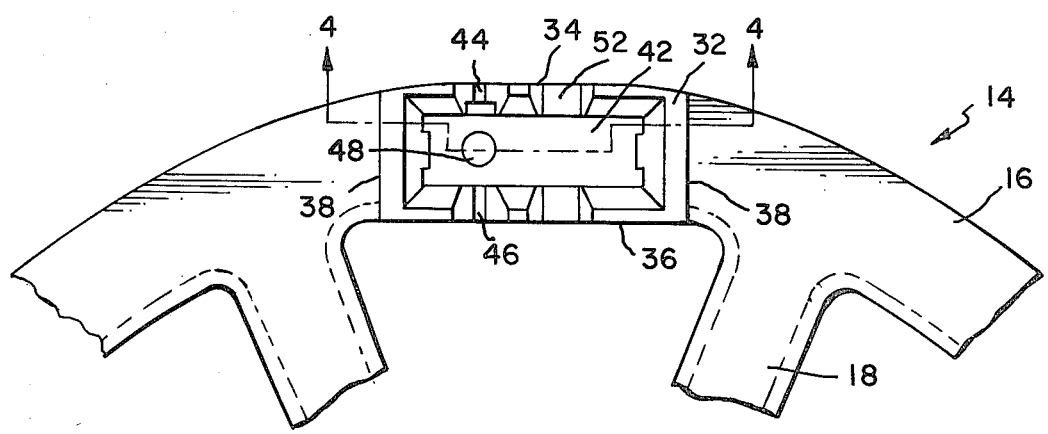
FIG. 3 is a fragmentary plan view of a portion of the housing support showing one of the terminal housings.
Figure 8:
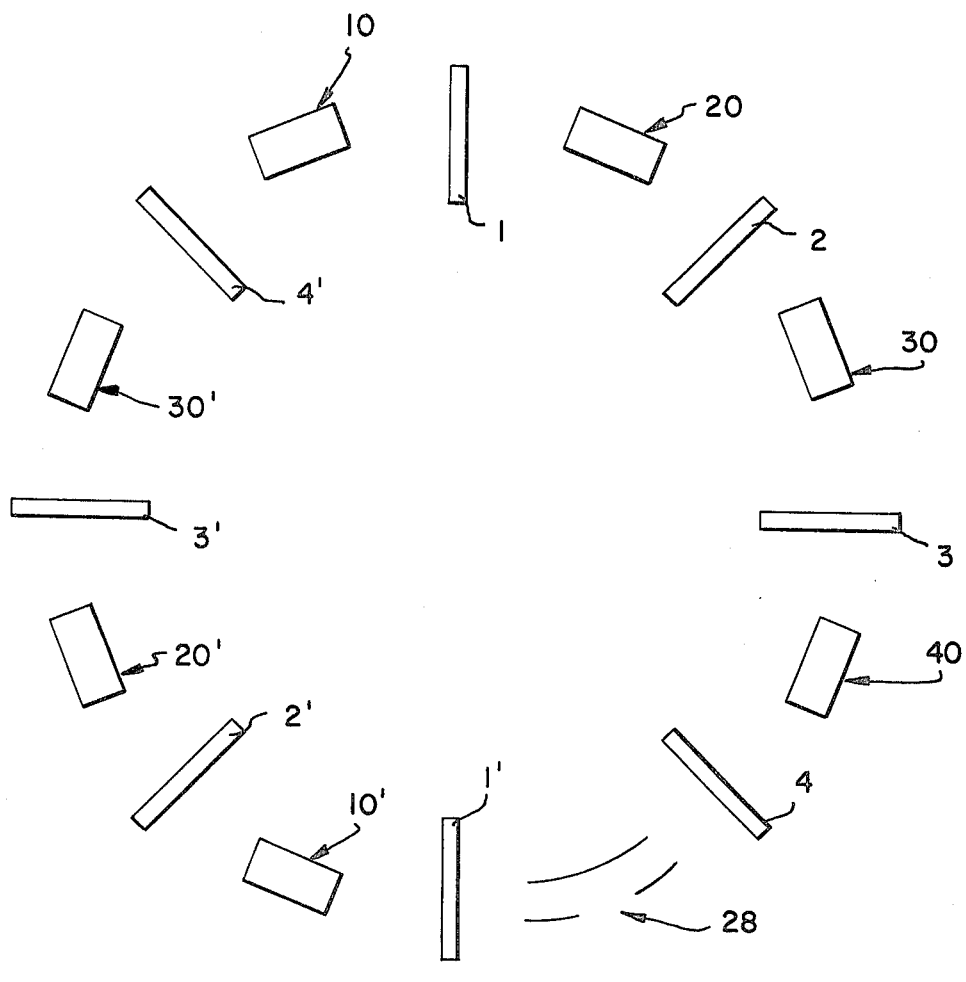
FIG. 8 is a diagrammatic view showing the coil supports, the terminal-receiving housings and the strain relief means of a stator core prior to winding of the coils thereon.

A stator assembly 6 of a four phase stator having eight coils, as shown in FIGS. 1 and 2, comprises a cylindrical stator core 8 composed of a stack of identical lamina of magnetic material. The lamina have integral inwardly directed arms which form coil supports 1, 2, 3, 4 and 1', 2', 3' and 4'. These coil supports are located at equally spaced angular intervals with the supports identified by the reference numerals having prime marks, being opposite to the supports identified with the same numerals not having prime marks.

Stator core 8 has an upper face 12, as viewed in the drawing, and a circular molding 14 is mounted on this face and secured to the core 8 in any suitable manner. The molding 14 has a circular section 16 having the same diameter as the stator core and inwardly directed arms 18 which extend over the upper surface of the coil supports 1-4 and 1'-4'. The ends of the arms 18 have upstanding portions 22 which serve as retainers or keepers for the coils 88 which are wound on the coil supports. The molding 14 also has depending flanges 24, 26 which extend over portions of the core and over the coil supports and provide a smooth surface against which the coils are wound, as is conventional practice in the manufacture of stepper motors. The molding 18 may be of any suitable insulating material, preferably a thermoplastic such as nylon.

A plurality of housings 10, 20, 30 and 40 and 10', 20', 30' extend upwardly from the circular portion 16 of the molding at spaced angular intervals such that one housing is located between each adjacent pair of coil supports excepting the coil supports 4 and 1' and a lead wire strain relief 28 is provided on the molding between the coil supports 4 and 1'. The housing 10' is generally opposite to the housing 10 but is not precisely opposite, and the housing 10 is associated with the coil support 1 while the housing 10' is associated with the coil support 1' in a manner which will be described below. For reasons which will soon become apparent, the number of housings is one less than the number of coil supports and the number of coils on the stator.

The housings 10-40 and 10'-30' are identical to each other so that a description of one will suffice for all and the housing 10 shown in FIGS. 3-6 is therefore described in detail below.

The housing extends upwardly from the circular portion 16 of the molding and has an upper terminal-receiving surface 32, a radially outwardly directed sidewall 34, a radially inwardly directed sidewall 36 and endwalls 38. The outwardly directed sidewall 34 is recessed at its lower end 39 as viewed in FIGS. 5 and 6 to provide coil wire-receiving surfaces or guide means when the coils are wound on the stator.

A terminal-receiving cavity 42 extends into the housing from the surface 24 and is dimensioned to receive a terminal 54 shown in FIG. 7 and is therefore substantially rectangular. A pair of aligned coil wire-admitting slots 44, 46 are provided in the sidewalls 34, 36 respectively. The slot 44 is relatively shallow as compared with the slot 46 and a column 48 extends upwardly from the inner end 50 of the cavity 42, the upper end of this column being coplanar with the inner end of the wire-admitting slot 46 in the inwardly directed sidewall 36. Lead wire-admitting slots 52 are also provided in the sidewalls 34, 36 and are dimensioned to receive insulated lead wires as will also be described below.

The terminals 54 which are dimensioned to enter the cavity each comprise parallel plate-like sections 56, 58 which are connected at their lower ends by a bight 60. The upper end of the plate section 56 is formed towards the plate section 54 as shown at 62 so that a seam extends along the end of section 62.

Aligned coil wire-receiving slots 64 are provided in the plate sections 54 and 56 and extend downwardly as viewed in the drawing to the bight 60 which was provided with an enlarged opening 66. Narrow shoulders 68 are formed at the lower ends of these slots 64 by shearing the material along L-shaped shear lines during forming so that a section of metal is bent away from the plane of the metal stock and the bent sections are then returned or bent back into their original positions. This shearing and bending operation has the effect of displacing the sheared metal sections toward each other by a very slight distance thereby to provide narrow shoulders having a width of about 0.0004" which penetrate the thin varnish-type insulation of the coil wire.

Aligned lead wire-receiving slots 70 are also provided in the plate sections 54, 56 and extend downwardly from an enlarged opening 72 in the bent-over section 62 and in the upper portions of the two plate-like sections 54-56. The slots 70 have a width such that upon movement of an insulated lead wire into the slots, the insulation will be penetrated and contact will be established with the lead wire. Terminals as shown at 54 are preferably produced as a continuous strip by stamping and forming operations, the terminals being connected to a continuous carrier strip 74 by connecting sections 76. At the time of insertion of a terminal into a housing, the terminal is severed from the carrier strip. The terminals are advantageously provided with barbs 78 extending from the side edges of the plate sections 54, 56 which dig into the internal sidewalls of the cavity and retain the terminals in their inserted positions.

The winding of the coils and the formation of the electrical connections between the lead wires and the coil windings is illustrated in FIGS. 8-12, FIG. 8 being a diagrammatic representation of the positions of the housings and the coil supports. The winding operation may be carried out by known types of coil winders such as machines available from Windamatic Systems Incorporated, of Fort Wayne, Ind., and from Essex Machine and Terminal Division of Essex International, also of Fort Wayne, Ind.

Figure 9:
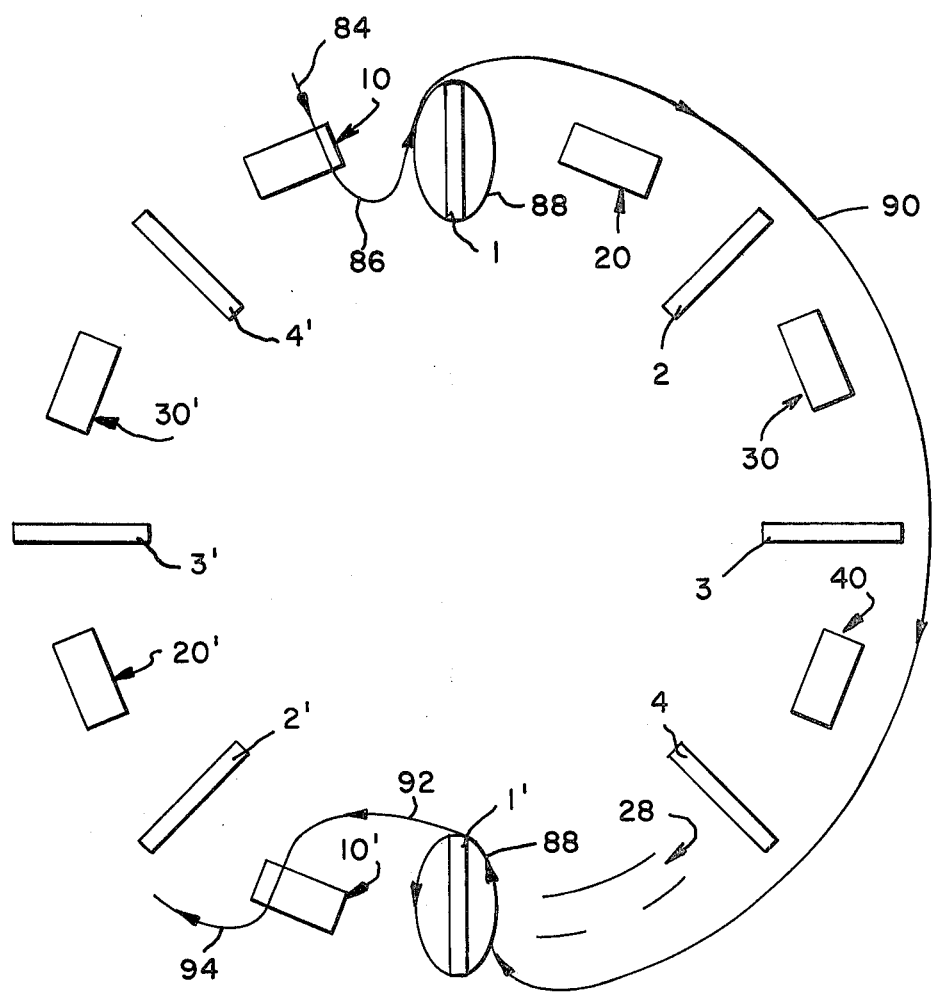
FIGS. 9, 10 and 11 are views similar to FIG. 8 illustrating the process of winding the coils on the stator core, locating the coil wire in the housings, and finally cutting away the excess wire.

As shown in FIG. 9, the coil wire, generally indicated at 84, is drawn from an endless source and passed through the coil wire-admitting slots in the housing 10. The winding machine then moves to the coil support 1 and winds a coil 88 on this coil support. A section 86 of wire thus extends from the housing 10 to the wound coil 88. The wire is then laced around the periphery of the stator to coil support 1' and located in the recesses 39 at the lower ends of the housings (see FIG. 6). A coil 88 is then wound on this coil support 1' which is opposite to coil support 1. The wire is then laced from the coil on support 1' to the housing 10' and positioned in the coil wire-admitting slots 44, 46 in this housing with the wire entering the housing at the inwardly directed sidewall 36 and extending from the outwardly directed sidewall 34. An intermediate section of wire 90 will thus extend from the coil 88 on coil support 1 to the coil 88 on coil support 1' and another section of wire 92 will extend from the coil on support 1' to the housing 10'.

Figure 10:
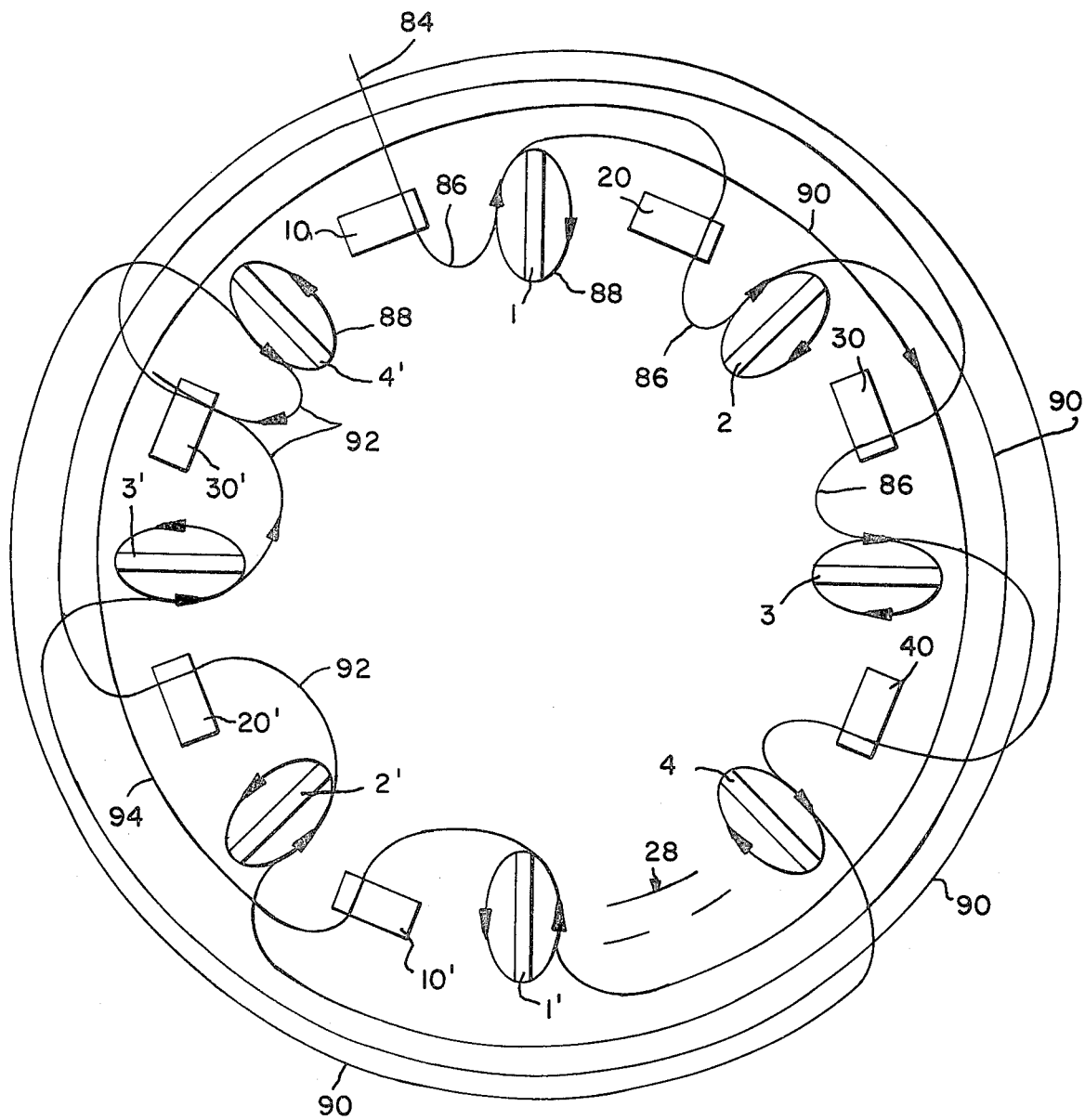

The wire is then laced in a clockwise direction around the periphery of the core to the housing 20 so that a section 94 of wire extends from outwardly directed sidewall 34 of housing 10' to the outwardly directed sidewall 34 of the housing 20. The wire is then positioned in the coil wire-admitting slots of housing 20, laced over to the coil support 2, wound on the coil support 2 and then laced around the periphery of the stator to coil support 2'. After winding a coil 88 on support 2', the wire is laced through the wire-admitting slots in the housing 20' in the manner described with reference to housing 10'. This winding process is repeated for each pair of opposite coil supports until a coil 88 is wound on coil support 4' as shown in FIG. 10 and the wire from the coil on coil support 4' is passed through the wire-admitting slots in the housing 30'. The housing 30' thus receives end portions 92 of coil wires from both of the coils on the supports 3' and 4'.

Figure 11:
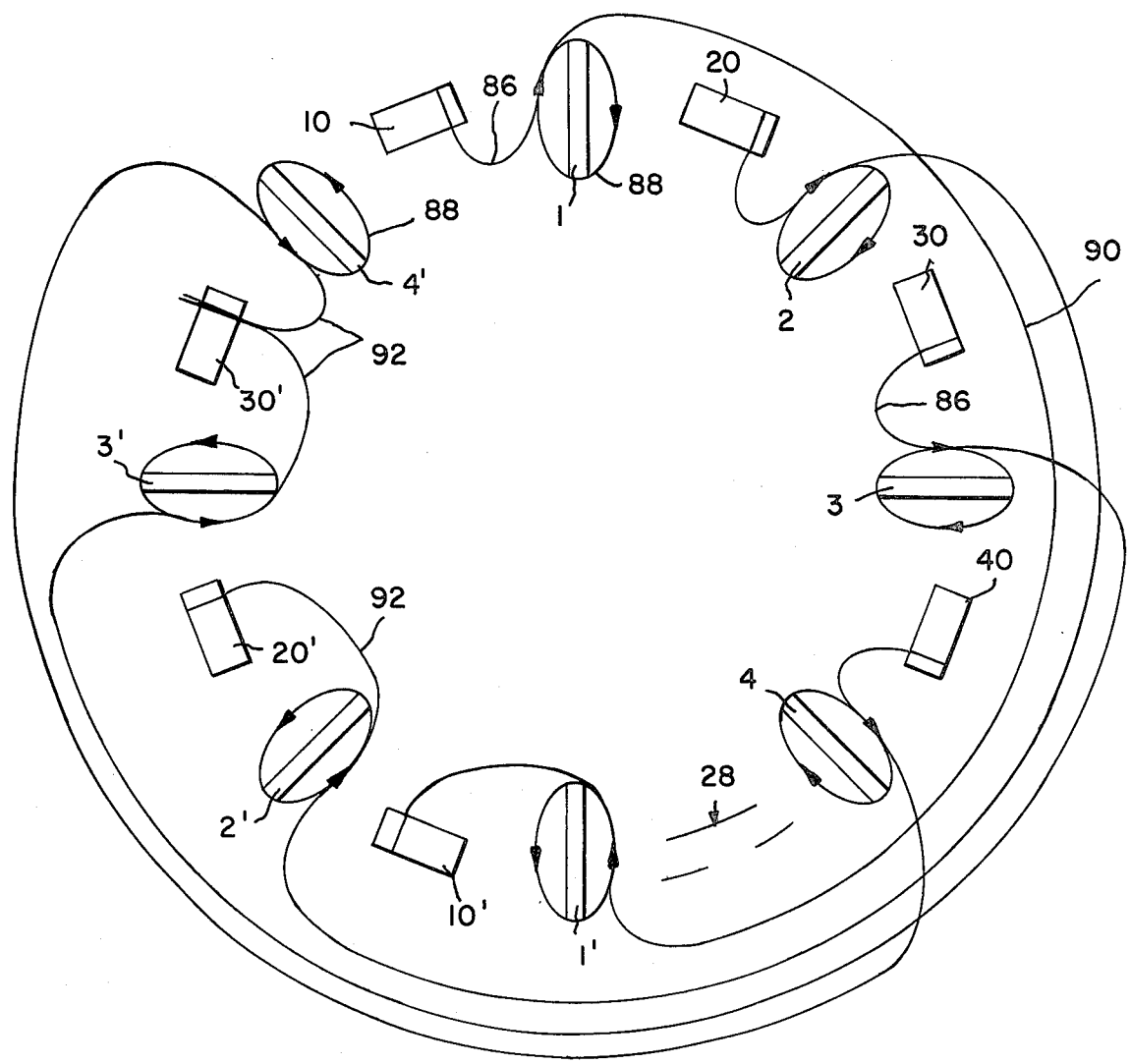

The winding process described above is continuous and at the conclusion of the process, the wire extends as an unbroken filament along all of the paths shown in FIG. 10. After the stator is removed from the winding machine, a terminal is inserted into each terminal-receiving cavity by an insertion punch 93, FIG. 13, and at the same time a cutting blade 95 is passed over the outwardly directed sidewalls 34 of the housings thereby to cut the coil wire 84 wherever it extends to or from an outwardly directed sidewall 34 of a housing. This operation thus removes the sections of wire 94 and at the conclusion of this terminal inserting and wire cutting operation, opposite pairs of coils 88 will be connected in series as shown in FIG. 11 by intermediate wire portions 90 and the end portions 86, 92 of the wires of each pair of coils will extend to an adjacent housing. The terminal insertion and wire trimming operation is preferably carried out by means of an apparatus of the general type shown in U.S. Pat. Nos. 4,099,316 and 3,984,908, suitably modified to accept a stator coil.

Figure 12:
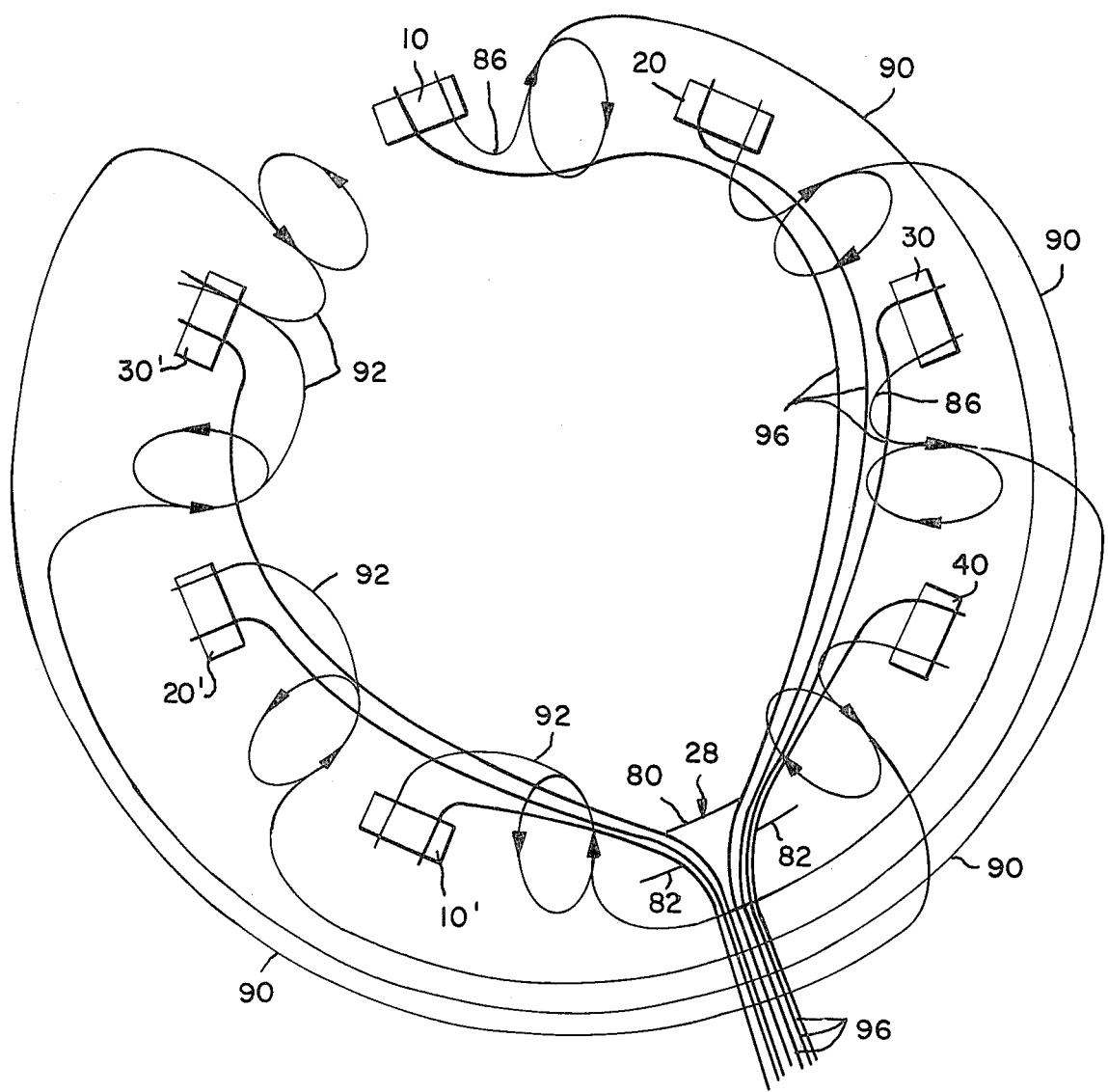
FIG. 12 is a view similar to FIG. 8 showing the location of the lead wires in the finished stator.

The final step of the assembly process is shown in FIG. 12 (the coil supports 1-4 and 1'-4' being omitted from this view) and involves only the placement of lead wires 96 in housing cavities 42 by moving the lead wires laterally of these axes into the wire-admitting slots 52 of the housing and into the wire-receiving slots 70 of the terminals 54. In the embodiment disclosed, the lead wires are dressed around inner portions of the stator, over the coils 88 and through the strain relief means. The strain relief means comprises an inner wall 80 on the molding and two spaced-apart outer walls 82. These walls thus form a constricted area which guide the wires from the stator and which impose a clamping force on the wires.

The finished stator in accordance with the invention as shown in FIG. 1 is neat and orderly in appearance and provides protected electrical connections for the lead wires and the coil wires. The stator will withstand normal and even abusive handling during subsequent manufacturing steps in the assembly of the completed motor. The manufacturing method of the invention is extremely advantageous in that virtually all of the operations can be carried out by a winding machine and the previously required manual steps of cutting out the scrap wire (94 in FIGS. 9 and 10), identifying the proper coil winding ends and connecting them to the proper lead wires is totally eliminated. The method thus very substantially reduces the cost of producing a stepper motor stator assembly.

FIG. 14 shows the schematic diagram for the four phase stepper motor stator having eight coils or two coils per phase as described above. The same reference numerals are used in FIG. 14 to identify the coil supports and the housing as are used in FIGS. 1-12, however, the lead wires are not shown in FIG. 14. The schematic diagram of FIG. 14 is included in order to facilitate an understanding of the schematic diagrams of FIGS. 15 and 16 which illustrate the practice of the invention as applied to other types of stepper motor stators.

FIG. 15 is a schematic diagram for a three phase stepper motor stator having a total of twelve coils so that each phase has four coils. This stator has three separate coil wires, the first of which extends through a housing 104 to coil support 98 on which a coil is wound. This coil wire then extends from coil support 98, to coil support 98', to coil support 98'', then to 98''' and finally through a housing 104'. Coils are of course wound on the intermediate coil supports 98' and 98'' as well as the final coil support 98'''. The second coil winding and the third coil winding extend through housings 106 and 108, respectively, to coil supports 100 and 102, respectively. Each of these coil wires extends to two intermediate coil supports and then to final coil supports 100''' and 102''', on which the final coils of the sets are wound. The ends of these two windings extend through housings indicated at 106' and 108'.

FIG. 16 shows the schematic diagram for a two phase stepper motor stator having a total of eight coils. There are thus two separate coil wires in the stator, the first of which extends from a housing 114 to a coil support 110 and then to coil supports 110′, 110″, and 110‴, the end of this winding extending from coil support 110‴ to a housing 114′. The other coil wire similarly extends from a housing 116 to coil supports 112, 112′, and 112″ and 112‴ to a housing 116′. As with the embodiment described and shown in FIGS. 1–12, the intermediate portions of the coil wires which extend between coils of each set are preferably dressed around the periphery of the stator.

The principles of the invention can thus be applied to the types of stepper motor stators shown in FIGS. 15 and 16 by programming the winding machine to lace the wires in a manner such that the wiring of FIGS. 15 and 16 is achieved. The wires would be laced continuously and at the conclusion of the lacing operation, the selected wires would be cut away and discarded in accordance with the principles explained above for the manufacture of a four phase stepper motor stator. FIGS. 15 and 16 are presented only as further examples of the practice of the invention and the principles of the invention can obviously be used for still other types of stepper motor stators.

It should be mentioned that certain of the coil wire ends are commonly connected in all stepper motor stators and if desired, a specialized housing can be provided for the ends of these wires which are commonly connected in the completed motor. Alternatively, lead wires extending from the wires which are to be commonly connected can simply be connected together in a crimped splice connection.

We claim:

1. A stepper motor stator of the type comprising a stator core, a plurality of integral coil supports extending inwardly towards the center of said core at equally spaced angular intervals, a coil winding of coil wire on each of said coil supports with the windings on selected coil supports being connected in series by intermediate portions of said coil wires, and lead wires connected to the ends of said coil wires, said stator having:
   a plurality of terminal-receiving housings mounted on said stator core, each of said housings being located proximate to an adjacent pair of said coil supports with one housing being proximate to at least every adjacent pair of coil supports excepting at least one adjacent pair,
   each of said housings having terminal-receiving cavity means therein, and each housing having a rdially inwardly directed side surface and having a radially outwardly directed side surface, coil wire-admitting slots in said side surfaces communicating with said cavity means,
   said ends of said coil wires extending from said windings on said coil supports to an adjacent housing, through said coil wire-admitting slot in said radially inwardly directed side surface, through said cavity and to said coil wire-admitting slot in said radially outwardly directed side surface, said ends being cut at said coil wire-admitting slot in said radially outwardly directed side surfaces, and
   terminals in said cavities, said ends of said windings and said lead wires being electrically connected to said terminals.

2. A motor stator as set forth in claim 1, each of said terminals having a coil wire-receiving slot and a lead wire-receiving slot therein, said ends of said coil wires being received in said coil wire-receiving slots and said lead wires having end portions which are received in said lead wire-receiving slots.

3. A motor stator as set forth in claim 2, said housings being integral with, and extending from, a supporting ring, said ring being mounted on one face of said stator.

4. A motor stator as set forth in claim 2, said intermediate portions of said coil wires extending around peripheral portions of said stator, said intermediate portions being located outwardly of said housings and extending past said radially outwardly directed side surfaces.

5. A motor stator as set forth in claim 1, all of said housings being mounted on one face of said stator core, one of said housings being proximate to every adjacent pair of coil supports except one adjacent pair of coil supports, lead wire guide and strain relief means proximate to said one adjacent pair of coil supports, said lead wires extending from said terminals and through said guide and strain relief means.

6. A motor stator as set forth in claim 1, said stator being intended for use in a four phase, eight coil motor, said stator having eight coil supports on which said coils are wound with the coils which are opposite to each other being connected in series.

7. A stepper motor stator of the type comprising a stator core, a plurality of "n" integral coil supports extending inwardly towards the center of said core at equally spaced angular intervals, a coil winding of coil wire on each of said coil supports with the windings on coil supports which are opposite to each other being connected in series by intermediate portions of said coil wires, and lead wires connected to the ends of said coil wires,
   a plurality of "n-1" terminal-receiving housings, said housings being mounted on one face of said core at spaced angular intervals and between every adjacent pair of coil supports excepting one adjacent pair of coil supports, an insulating strain relief means on said one face between said one adjacent pair of coil supports,
   each of said housings have terminal-receiving cavity means therein, and each housing having a radially inwardly directed side surface and having a radially outwardly directed side surface, coil wire-admitting slots in said side surfaces communicating with said cavity means,
   said ends of said coil wires extending from said windings on said soil supports to and adjacent housing, through said coil wire-admitting slot in said radially inwardly directed side surface, through said cavity and to said coil wire-admitting slot in said radially outwardly directed side surface, said ends being cut at said coil wire-admitting slot in said radially outwardly directed side surfaces,
   terminals in said cavities, said ends of said windings and said lead wires being electrically connected to said terminals,
   said intermediate portions of said coil wires extending around peripheral portions of said stator, said intermediate portion being located outwardly of said housings and extending past said outwardly directed side surfaces,
   said lead wires extending from said terminals towards and through said strain relief means.

8. A motor stator as set forth in claim 6, said stator having at least six coil supports.

9. A motor stator as set forth in claim 7, said housings and said strain relief means being integral with a one-piece molding mounted on said one face of said core.

10. A motor stator as set forth in claim 7, each of said terminals having a coil wire-receiving slot and a lead wire-receiving slot therein, said ends of said coil wire being received in said coil wire-receiving slots of said terminals and said ends of said lead wires being received in said lead wire-receiving slots.

11. A motor stator as set forth in claim 7, said lead wires extending from said terminals along generally arcuate paths towards said strain relief means and past said radially inwarded directed side surfaces of said housings.

* * * * *